United States Patent
Guthals et al.

(10) Patent No.: US 7,505,138 B2
(45) Date of Patent: Mar. 17, 2009

(54) HOLOGRAPHICALLY COMPENSATED, SELF-REFERENCED INTERFEROMETER

(75) Inventors: Dennis M. Guthals, Thousand Oaks, CA (US); Blair F. Campbell, Chatsworth, CA (US); Daniel J. Sox, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 41 days.

(21) Appl. No.: 11/307,708

(22) Filed: Feb. 17, 2006

(65) Prior Publication Data

US 2007/0195329 A1    Aug. 23, 2007

(51) Int. Cl.
*G01B 9/021* (2006.01)
(52) U.S. Cl. .................................................. 356/457
(58) Field of Classification Search ................. 356/450, 356/457, 453, 510
See application file for complete search history.

(56) References Cited

U.S. PATENT DOCUMENTS

| | | | | |
|---|---|---|---|---|
| 3,831,436 A * | 8/1974 | Sanford | ...................... | 356/364 |
| 5,148,323 A * | 9/1992 | Campbell et al. | ........... | 359/738 |
| 5,378,888 A * | 1/1995 | Stappaerts | ................ | 250/201.9 |
| 5,684,545 A * | 11/1997 | Dou et al. | ....................... | 349/1 |
| 6,115,123 A * | 9/2000 | Stappaerts et al. | .......... | 356/457 |
| 6,538,791 B2 * | 3/2003 | Trezza | ......................... | 359/237 |
| 6,809,307 B2 * | 10/2004 | Byren et al. | ............. | 250/201.9 |
| 2002/0190040 A1* | 12/2002 | Thompson et al. | ...... | 219/121.73 |
| 2003/0067610 A1* | 4/2003 | Davies | ........................ | 356/520 |
| 2006/0039051 A1* | 2/2006 | Baba et al. | .................... | 359/35 |
| 2007/0024854 A1* | 2/2007 | Jungwirth | .................... | 356/450 |
| 2007/0030542 A1* | 2/2007 | Grasso et al. | .................. | 359/9 |
| 2007/0109547 A1* | 5/2007 | Jungwirth | .................... | 356/450 |

* cited by examiner

*Primary Examiner*—Tarifur Chowdhury
*Assistant Examiner*—Jonathan M Hansen
(74) *Attorney, Agent, or Firm*—Charles L. Moore; Moore & Van Allen, PLLC

(57) ABSTRACT

A holographically, self-referenced interferometer may include a detector to detect interference fringes in a reference leg optical signal. The interferometer may also include a holographic correction device to holographically compensate the reference leg optical signal in response to the detected interference fringes.

33 Claims, 4 Drawing Sheets

HOLOGRAPHICALLY COMPENSATED, SELF-REFERENCED INTERFEROMETER

BACKGROUND OF THE INVENTION

The present invention relates to laser beams, laser and optical systems and the like, and more particularly to holographic compensation of a light source.

In some applications, generating or providing an optical beam that is substantially free of distortions, fringes and other anomalies or defects may be highly desirable. The applications include but are not limited to: free-space optical communications, self-referenced wave-front sensors, and all-optical wave-front compensation systems. A self-referenced interferometer is a self-referenced wave-front sensor requiring such an optical beam as the output of the reference leg. This reference leg output often is subject to anomalies, such as spatial filter throughput dropouts, fades, intensity fluctuations and the like. These anomalies may result from dynamic signal wavefront aberrations such as those caused by light propagation through atmospheric conditions or aero-turbulence. The signal wavefront aberrations may cause loss of signal at tilt sensors and interference detectors controlling adaptive optics wavefront compensation systems leading to poor system performance as a result of fades, dropouts, loss of tilt control, loss of high-order wavefront control and similar performance issues.

BRIEF SUMMARY OF THE INVENTION

In accordance with an embodiment of the present invention, an interferometer may include a detector to detect interference fringes in a reference leg optical signal. The interferometer may also include a holographic correction device to holographically compensate the reference leg optical signal in response to the detected interference fringes.

In accordance with another embodiment of the present invention, a laser system may include a source to generate a laser beam. The laser system may also include a self-referenced interferometer to transmit the laser beam. The interferometer may include a holographically compensated reference leg that may provide a holographically compensated self-referenced wave or optical signal.

In accordance with another embodiment of the present invention, a method to compensate for signal wavefront aberrations may include detecting interference fringes in an optical signal. The method may also include holographically compensating the optical signal in response to the interference fringes to provide a signal wavefront substantially free of aberrations.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
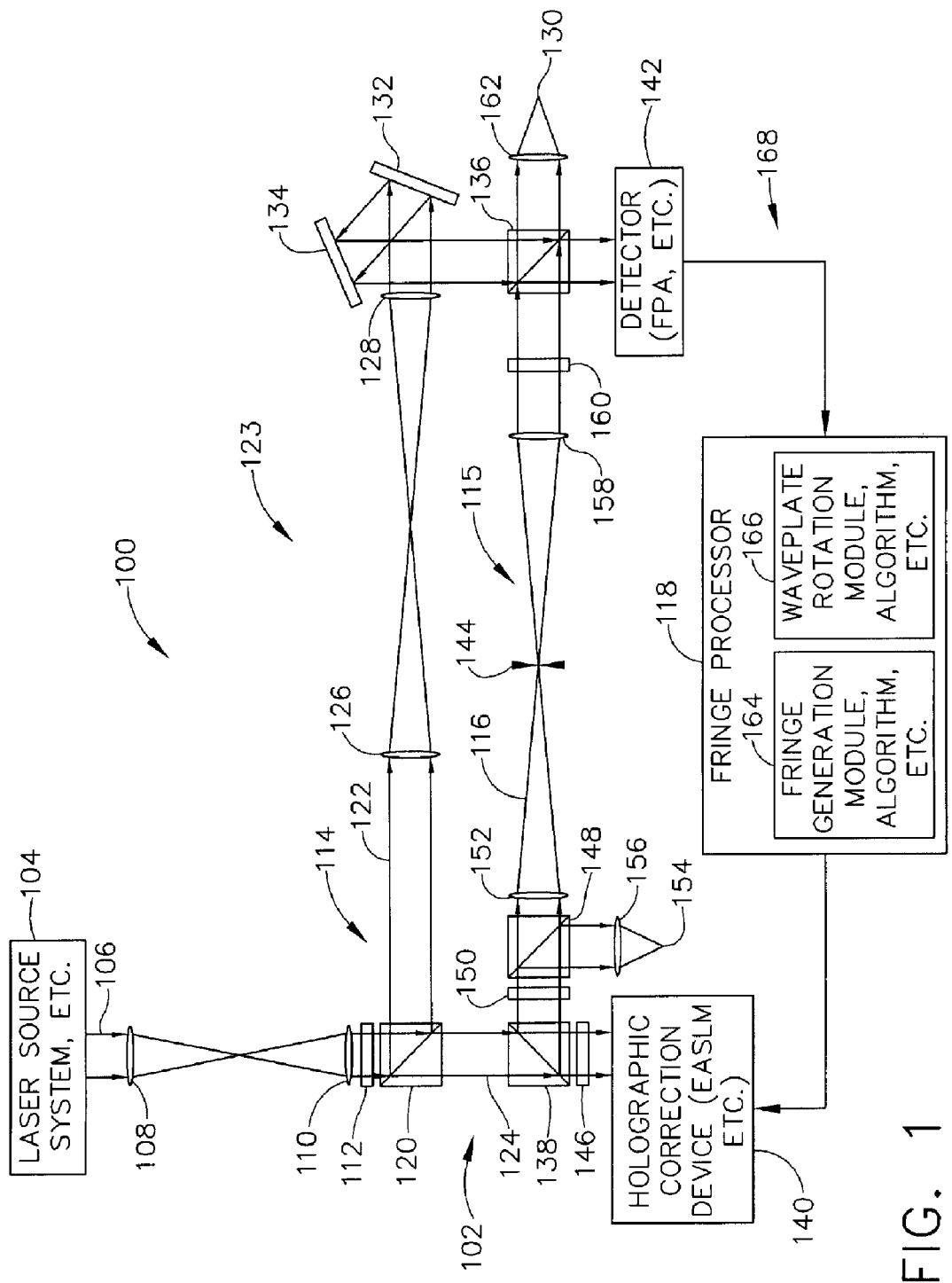
FIG. 1 is a block diagram of an example of a laser system including a holographically compensated self-referenced interferometer in accordance with an embodiment of the present invention.

FIG. 1 is a block diagram of an example of a laser system 100 including a holographically compensated self-referenced interferometer 102 in accordance with an embodiment of the present invention. The laser system may include a laser source 104 or the like to generate a laser beam 106. The laser system 100 may also include a relay telescope consisting of lenses 108 and 110 to relay the system pupil plane into the self-referenced interferometer at positions 124 and 114. An adjustable waveplate 112, polarization plate or similar device may be provided to control the power balance between a primary or test leg or signal leg 123 and a reference leg 115 of the interferometer 102.

The adjustable waveplate 112 may be a half wavelength ($\lambda/2$) waveplate and may be mechanically or electro-optically adjusted. Adjustment of the waveplate 112 may be controlled by a computer or processor, such as a fringe processor 118 or other processor.

The interferometer 102 may also include a polarization beam splitter 120 to split the laser beam 106 into a primary or signal leg light wave or optical signal 122 and a reference leg light wave or optical signal 116. The polarization beam splitter 120 in conjunction with the waveplate 112 provides the balancing function described above.

The signal leg 123 of the interferometer 102 may include a relay telescope consisting of lenses 126 and 128 to relay the pupil plane 114 to a plane of a detector 142. A pair of reflectors 132 and 134 may be selectively positioned to match the optical path length of the signal leg 123 to that of the reference leg 115 and to direct the signal leg light wave or optical signal 122 to interfere with the reference leg signal 116 at the detector 142.

The reference leg 115 may include an input/output beam splitter 138. The input/output polarizing beam splitter 138 may transmit the reference leg light wave or optical signal 116 to a holographic correction device 140 to holographically compensate the reference leg light wave or optical signal 116 in response to a detected fringe pattern on the detector 142. The holographic correction device 140 may be a computer controlled or electrically addressed spatial light modulator (EASLM) or similar device. As will be described in more detail with respect to FIG. 2, a bootstrap startup process may be utilized which includes using a computer, such as fringe processor 118 or another computer, to generate a low-order correction hologram for initially compensating the reference leg optical signal 116, followed by a handover to applying actual self-referenced interferometer (SRI) interference fringes detected or recorded by the detector 142.

Figure 3:
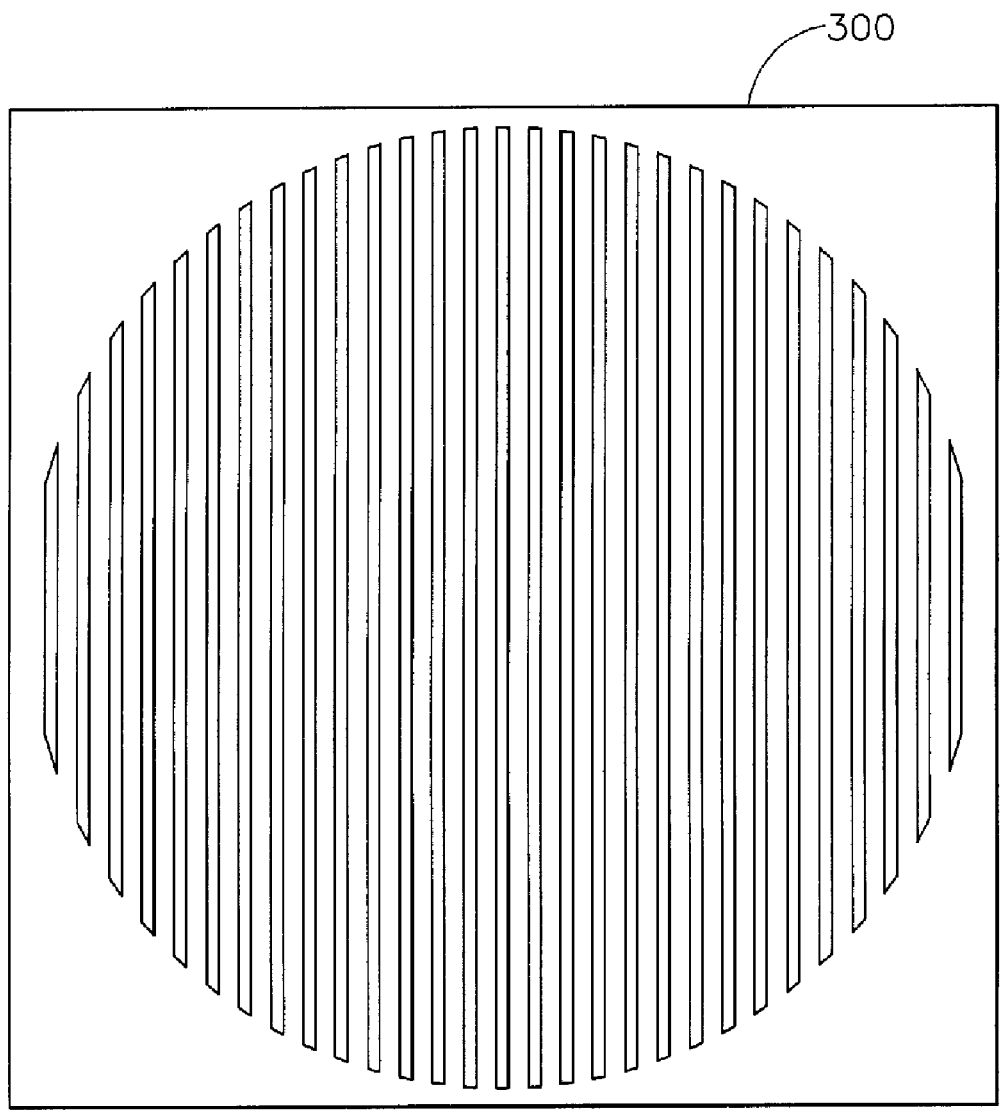
FIG. 3 is an example of a computer generated startup fringe pattern for a bootstrap startup process for compensating an optical wave or signal for aberrations in accordance with an embodiment of the present invention.

The bootstrap process may begin with initial injection of the diffracted conjugate order of the distorted reference leg optical signal 116 from computer generated fringes at the SRI signal/reference carrier frequency on the holographic correction device 140 or EASLM. Referring also to FIG. 3, FIG. 3 is an example of a computer generated startup fringe pattern 300 for a bootstrap startup process for compensating an optical wave or signal for expected tilt aberrations in accordance with an embodiment of the present invention. The fringe pattern may be a binary or blazed fringe pattern.

When sufficient reference leg signal levels are detected through a spatial filter 144, pinhole or the like, interference fringes of sufficient contrast may be detected by the detector 142. Compensation of the reference leg optical wave or signal 116 may then be handed over or transferred to the hologram correction device 140 or EASLM to replace the computer generated or artificial fringes. After this handover, the reference leg optical signal 116 may be substantially fully compensated based on interference fringes detected and recorded by the detector 142 and the reference leg optical signal 116 throughput may be significantly enhanced and stabilized. The detector 142 may be a focal plane array (FPA), camera or the like.

A polarization rotator 146 may be placed between the holographic correction device 140 and the input/output polarizing beam splitter 138 of the reference leg 116 to provide the proper polarization orientation of the optical wave or signal 124 for the holographic correction device 140.

The reference leg 116 may also include a second polarization beam splitter 148 and an adjustable waveplate 150 or polarization plate placed between the input/output polarizing beam splitter 138 and the second polarizing beam splitter 148. The adjustable waveplate 150 may be a half wavelength ($\lambda/2$) waveplate and may be mechanically or electro-optically adjusted by a computer, such as fringe processor 118 or another computer. The adjustable waveplate 150 may be adjusted to maintain constant fringe contrast and to maximize optical signal output by controlling the compensated reference wave 116 that is fed-back to the spatial filter 144 by diverting a selected portion of the wave or signal, if needed. Accordingly, the waveplate 150 may orient a selected portion of the compensated reference leg optical signal in one polarization that may be transmitted by the second polarizing beam splitter 148 to a reference leg focusing lens 152. The light not sent to the spatial filter formed by lens 152 and pinhole 144 is collected by lens 156 and focused to a location or a point 154. This compensated output at point 154 is substantially free of distortions, fringes and other anomalies or defects.

The lens 152 may focus the conjugate order or compensated portion of the reference leg optical wave 116 on a pinhole 144, further removing aberrations through spatial filtering. After filtering, any distortions or other anomalies may be substantially removed from the periphery of the reference leg optical signal or wave 116 to provide a substantially undistorted signal or wave. Referring back to FIG. 1, a collimating lens 158 may collimate the compensated reference leg optical wave after the spatial filter 144.

An adjustable output waveplate 160 may be placed in the reference leg 116 before an output beam splitter 136 to receive the collimated reference leg optical wave from the collimating lens 158. The output ($\lambda/2$) waveplate 160 is set to rotate the polarization of the reference leg 115 to match that of the signal leg 123 to form an interference pattern at the detector 142. The partial-reflecting output beam splitter 136 combines the signal and reference legs for interference at the detector 142. The reflectivity of the output beam splitter 136 may be about 50%. The balancing of the light intensity of the signal and reference legs, 123 and 115, may be achieved by mechanically or electro-optically adjusting waveplates 112 and 150. The interference fringes are recorded by the detector 142 and input to a fringe generation algorithm 164 to control the holographic correction device 140 or EASLM to generate a binary or blazed fringe pattern. The binary or blazed fringe pattern may be applied to the reference leg optical beam to compensate for any dropouts, fades, intensity fluctuations or other anomalies resulting from dynamic wavefront aberrations that may be caused by the light or optical signal propagating through adverse atmospheric conditions or aero-turbulence.

An output focusing lens 162 may focus light passed by the output beam splitter 136 to a focal point 130.

The fringe generation algorithm 164 may be operable on the fringe processor 118 to generate appropriate fringe patterns for continuously, holographically compensating the reference leg optical signal 124. A waveplate rotation algorithm 166 may also be operable on the fringe processor 118 to control adjustment of the waveplates 112 and 160. The waveplates 112 and 160 may be mechanically or electro-optically adjusted to maximize spatial filter throughput and reference/signal balancing. After handover, the waveplates may be adjusted to maintain constant fringe contrast and maximum useful area of the beam. The detector 142 or focal plane, the fringe processor 118 and the holographic correction device 140 may define a holographic compensation feedback loop 168 to continuously and autonomously compensate for any aberrations in the reference leg optical signal or wave 124 after handover.

Figure 2A:
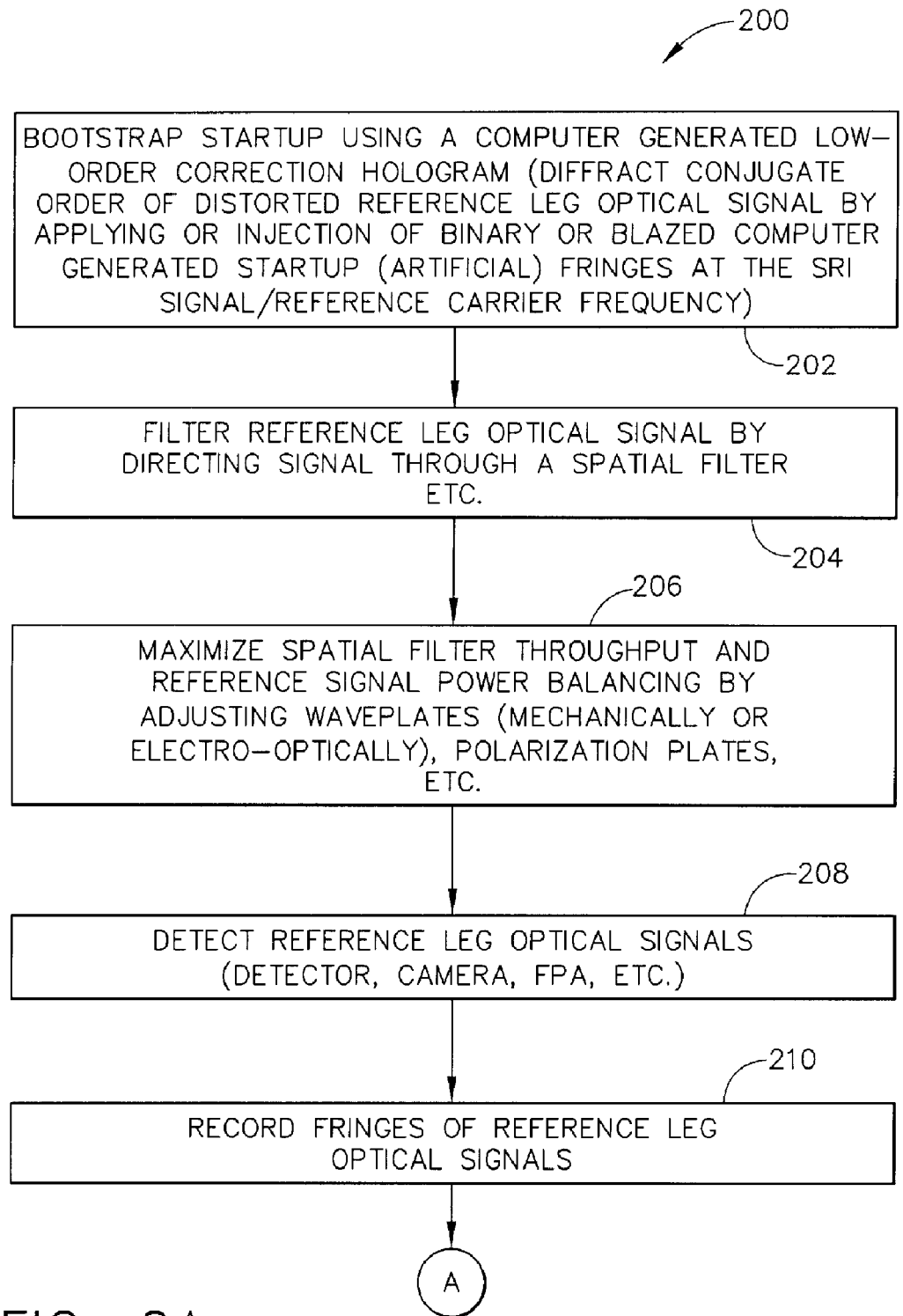
FIGS. 2A and 2B (collectively FIG. 2) are a flow chart of an example of a method for generating an optical wave or signal compensated for aberrations in accordance with an embodiment of the present invention.
Figure 2B:
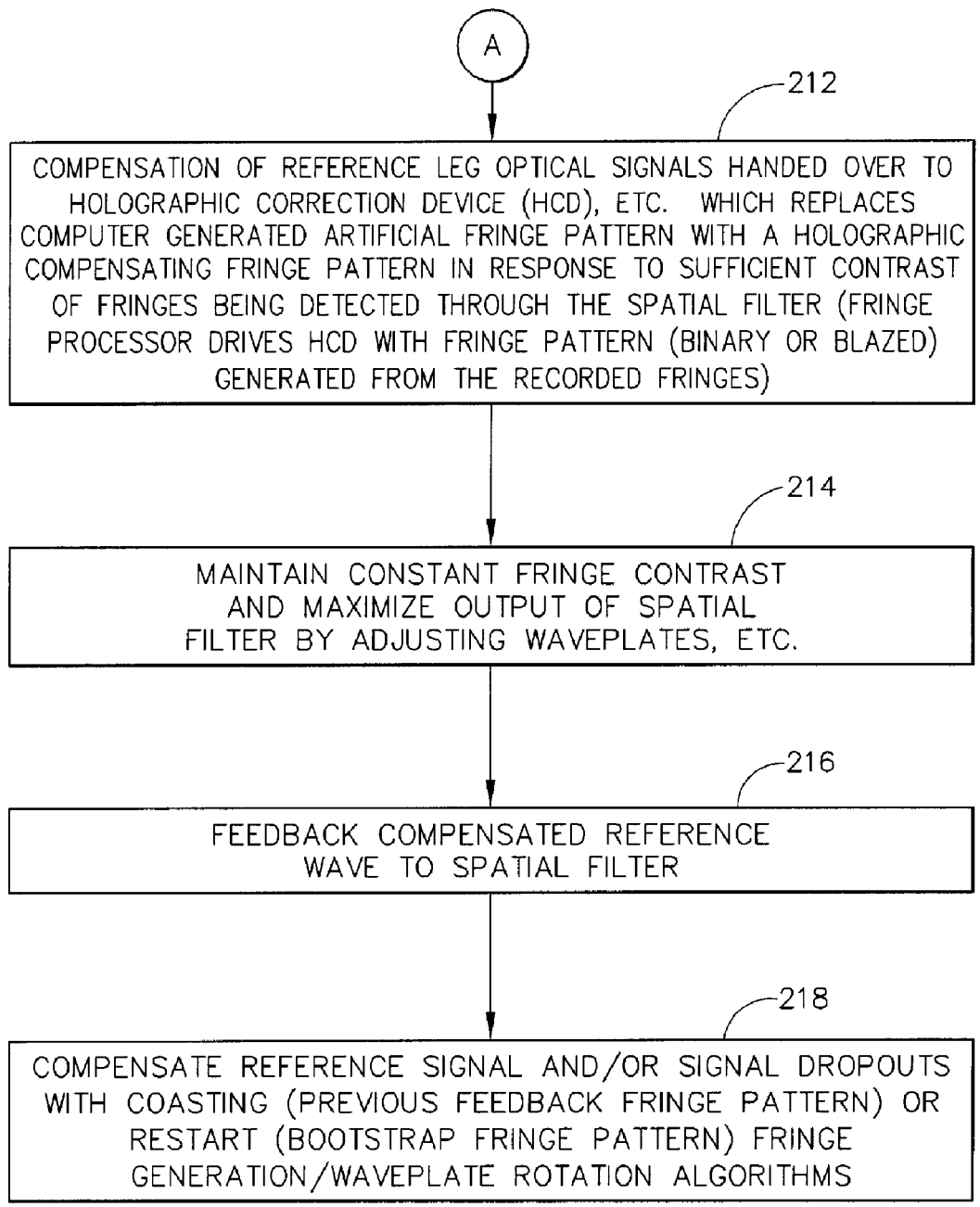

FIGS. 2A and 2B (collectively FIG. 2) are a flow chart of an example of a method 200 for generating an optical wave or signal compensated for aberrations in accordance with an embodiment of the present invention. The method 200 may be embodied in and performed by the system 100 of FIG. 1. In block 202, a bootstrap startup procedure similar to that previously described may be performed. The bootstrap startup procedure may involve using a computer generated or low-order-correction hologram as part of the reference leg or signal path to initially compensate for aberrations. The conjugate order of the distorted reference leg optical signal or wave may be diffracted by application or injection of a binary or blazed computer generated startup fringe pattern at the SRI signal/reference carrier frequency. As previously describe, FIG. 3 is an example of a computer generated startup fringe pattern 300 for a bootstrap startup process for initially compensating an optical wave or signal for aberrations in accordance with an embodiment of the present invention.

In block 204, the reference leg optical signal or wave may be filtered by directing the signal through a spatial filter, similar to filter 144 illustrated in FIG. 1. The reference leg optical signal or wave may be filtered to remove distortions or other anomalies from the periphery of the reference leg optical signal or wave and to provide a substantially undistorted signal or wave.

In block 206, spatial filter throughput may be maximized and power or light energy may be balanced between the reference leg optical signal and the primary or test leg optical signal. Similar to that previously discussed with respect to the system 100 of FIG. 1, the spatial filter throughput and power balancing may be accomplished by adjustable waveplates, polarization plates or other devices.

In block 208, reference leg optical signals may be detected. The optical signals may be detected by a detector, similar to detector 142 in FIG. 1, a focal plane array, camera or other light detection device. In block 210, interference fringes or a fringe pattern of the reference leg optical signals or wave may be recorded. The fringes or fringe pattern may be recorded by the detector or by a processor, similar to fringe processor 118 of FIG. 1.

In block 212, compensation of the reference leg optical signals or wave may be handed over to a holographic correction device, driven by fringe measurements replacing the computer generated artificial fringe pattern with a holographic compensating fringe pattern. The handover may occur in response to sufficient contrast of interference fringes being detected. A fringe processor may control or drive the holographic correction device to generate compensating fringe patterns from the detected or recorded fringes in blocks 208 and 210. The compensating fringe patterns may be binary or blazed type patterns.

In block 214, substantially constant fringe contrast and substantially maximum throughput of the spatial filter may be maintained. Similar to that previously discussed, the constant fringe contrast and maximum spatial filter throughput may be maintained by adjusting waveplates, polarization plates or the similar devices. The waveplates may be half wavelength ($\lambda/2$) and may be mechanically or electro-optically adjusted.

In block 216, the compensated reference wave or optical signal may be fed back to the spatial filter. In block 218, the reference leg signal or wave and/or signal dropouts may be compensated by coasting or feeding back the previous fringe pattern. Frames of the reference leg optical signal or wave may be recorded by the detector or focal plane array at a predetermined frame rate, such as about 1000 frames per second, and transferred to the fringe processor and holographic correction device for compensating the reference leg signal or wave. Accordingly, there may be a delay corresponding to the frame rate. For the example above, the delay may be about $1/1000$ of a second or about one frame. Typical systems with feedback and other operations related to compensating the reference leg signal operate at about ten times slower than the frame rate of their devices. The holographically compensated self-referenced interferometer of the present invention can operate basically at the speed that the components are able operate. Thus, higher pixel-count devices can be used, higher spatial correction can be realized, and faster correction can be achieved.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. An interferometer, comprising:
   a polarization beam splitter to split a laser beam into a primary leg optical signal within the interferometer and a reference leg optical signal within the interferometer;
   a partial-reflecting output beam splitter to combine the primary leg optical signal and the reference leg optical signal;
   a detector to detect interference fringes in the reference leg optical signal caused by combining the primary leg optical signal and the reference leg optical signal, wherein the primary leg optical signal and the reference leg optical signal remain within the interferometer and wherein the partial-reflecting output beam splitter directs a portion of the combined primary leg optical signal and the reference leg optical signal to the detector to detect the interference fringes;
   a holographic correction device to holographically compensate the reference leg optical signal in response to the detected interference fringes; and
   an input/output polarizing beam splitter to transmit the reference leg optical signal to the holographic correction device to holographically compensate the reference leg optical signal and to reflect the compensated reference leg optical signal to the partial-reflecting output beam splitter.

2. The interferometer of claim 1, wherein the detector comprises a focal plane array to detect the interference fringes in the reference leg optical signal.

3. The interferometer of claim 1, wherein the holographic correction device comprises an electrically addressed spatial light modulator.

4. The interferometer of claim 1, further comprising a fringe processor to control the holographic correction device in response to a fringe pattern generable from recorded interference fringes in the reference leg optical signal.

5. An interferometer comprising:
   a polarization beam splitter to split a laser beam into a primary leg optical signal within the interferometer and a reference leg optical signal within the interferometer;
   a partial-reflecting output beam splitter to combine the primary leg optical signal and the reference leg optical signal;
   a detector to detect interference fringes in the reference leg optical signal caused by combining the primary leg optical signal and the reference leg optical signal, wherein the primary leg optical signal and the reference leg optical signal remain within the interferometer and wherein the partial-reflecting output beam splitter directs a portion of the combined primary leg optical signal and the reference leg optical signal to the detector to detect the interference fringes;
   a holographic correction device to holographically compensate the reference leg optical signal in response to the detected interference fringes;
   an input/output polarizing beam splitter to transmit the reference leg optical signal to the holographic correction device to holographically compensate the reference leg optical signal and to reflect the compensated reference leg optical signal to the partial-reflecting output beam splitter;

a fringe processor to control the holographic correction device; and a holographic compensation feed back loop including a focal plane array, the fringe processor and the holographic correction device.

6. The interferometer of claim 5, further comprising a startup fringe pattern applicable to the reference leg optical signal, wherein compensation of the reference leg optical signal is handed over to the holographic compensation feedback loop in response to startup fringes of the startup fringe pattern, detected by the focal plane array, being of sufficient contrast to replace the startup fringe pattern with a compensation fringe pattern generable by the holographic correction device based on fringes recorded by the focal plane array.

7. The interferometer of claim 6, wherein the startup fringe pattern is a binary or blazed fringe pattern.

8. The interferometer of claim 5, further comprising a spatial filter to filter the reference leg optical signal.

9. The interferometer of claim 8, wherein the fringe processor generates startup fringes to diffract the reference leg optical signal to the spatial filter with a conjugate order of the reference leg optical signal centered on the filter.

10. The interferometer of claim 8, further comprising at least one waveplate being adjustable to maximize throughput through the spatial filter and to control power balance between the reference leg optical signal and a primary leg optical signal.

11. The interferometer of claim 8, further comprising at least one waveplate being adjustable to maintain a constant fringe contrast and to substantially maximize an output of a compensated reference wave fed-back to the spatial filter.

12. The interferometer of claim 11, wherein the at least one waveplate is mechanically or electro-optically adjusted.

13. The interferometer of claim 1, wherein the detector comprises a focal plane detector, and the holographic correction device comprises an electrically addressed spatial light modulator, and wherein the interferometer further comprises a fringe processor and a holographic feedback loop, wherein the fringe processor generates startup fringes for injection into the reference leg optical signal and drives the electrically addressed spatial light modulator with a fringe pattern generated from fringes recorded by the focal plane detector in response to the startup fringes detected by the focal plane detector being of sufficient contrast to handover compensation of the reference leg optical signal to the holographic compensation feedback loop including the focal plane array, the fringe processor and the electrically addressed spatial light modulator.

14. The interferometer of claim 13, further comprising a fringe generation algorithm and a waveplate rotation algorithm to compensate for signal dropouts by feeding back a previous fringe pattern or the startup fringe pattern.

15. A laser system, comprising:
a source to generate a laser beam; and
a self-referenced interferometer to transmit the laser beam, the interferometer including a holographically compensated reference leg, wherein the reference leg is holographically compensated by detecting interference fringes in a reference leg optical signal caused by combining a primary leg optical signal with the reference leg optical signal in an output beam splitter, wherein the primary leg optical signal and the reference leg optical signal are formed by splitting the laser beam in a polarization beam splitter, and the primary leg optical signal and the reference leg optical signal remain within the interferometer and the reference leg optical signal is transmitted to a beam compensation device by an input/output beam splitter.

16. The laser system of claim 15, wherein the self-referenced interferometer comprises:
a detector to detect the interference fringes in the reference leg optical signal; and
a holographic correction device to holographically compensate the reference leg optical signal in response to the detected interference fringes.

17. The laser system of claim 16, wherein the detector comprises a focal plane array to detect the interference fringes in the reference leg optical signal.

18. The laser system of claim 16, wherein the holographic correction device comprises an electrically addressed spatial light modulator.

19. The laser system of claim 16, wherein the self-referenced interferometer further comprises a fringe processor to control the holographic correction device in response to a fringe pattern generable from recorded interference fringes in the reference leg optical signal.

20. A laser system comprising:
a source to generate a laser beam;
a self-referenced interferometer to transmit the laser beam, the interferometer including a holographically compensated reference leg, wherein the self-referenced interferometer comprises:
a polarization beam splitter to split a laser beam into a primary leg optical signal within the interferometer and a reference leg optical signal within the interferometer;
a partial-reflecting output beam splitter to combine the primary leg optical signal and the reference leg optical signal;
a detector to detect interference fringes in the reference leg optical signal caused by combining the primary leg optical signal and the reference leg optical signal, wherein the primary leg optical signal and the reference leg optical signal remain within the interferometer and wherein the partial-reflecting output beam splitter directs a portion of the combined primary leg optical signal and the reference leg optical signal to the detector to detect the interference fringes;
a holographic correction device to holographically compensate the reference leg optical signal in response to the detected interference fringes;
an input/output polarizing beam splitter to transmit the reference leg optical signal to the holographic correction device to holographically compensate the reference leg optical signal and to reflect the compensated reference leg optical signal to the partial-reflecting output beam splitter;
a fringe processor to control the holographic correction device; and
a holographic compensation feed back loop including a focal plane array, the fringe processor and the holographic correction device.

21. The laser system of claim 20, further comprising a startup fringe pattern applicable to the reference leg optical signal, wherein compensation of the reference leg optical signal is handed over to the holographic compensation feedback loop in response to startup fringes of the startup fringe pattern, detected by the focal plane array, being of sufficient contrast to replace the startup fringe pattern with a compensation fringe pattern generable by the holographic correction device based on fringes recorded by the focal plane array.

22. A method to compensate for signal wavefront aberrations, comprising:
- detecting interference fringes in a reference leg optical signal in a self-referencing interferometer caused by combining a primary leg optical signal with the reference leg optical signal at a partial-reflecting output beam splitter;
- holographically compensating the reference leg optical signal in response to the interference fringes to provide a signal wavefront substantially free of aberrations, wherein the primary leg optical signal and the reference leg optical signal are formed by splitting a laser beam at a polarization beam splitter, and the primary leg optical signal and the reference leg optical signal remain within the interferometer;
- transmitting the reference leg optical signal from an input/output polarizing beam splitter to a holographic correction device to holographically compensate the reference leg optical signal;
- reflecting the compensated reference leg optical signal back to the input/output polarization beam splitter from said holographic correction device; and
- reflecting the compensated reference leg optical signal from said input/output polarizing beam splitter to said partial-reflecting output beam splitter.

23. The method of claim 22, further comprising diffracting a conjugate order of a distorted reference leg optical signal by applying an artificial startup fringe pattern to the reference leg optical signal.

24. The method of claim 22, further comprising filtering the reference leg optical signal through a spatial filter.

25. The method of claim 24, further comprising:
- maximizing throughput through the spatial filter; and
- controlling power balance between the reference leg optical signal and the primary leg optical signal.

26. The method of claim 25, further comprising adjusting a waveplate to maximize throughput through the spatial filter and to balance the signal power.

27. The method of claim 22, further comprising handing over compensation of the reference leg optical signal to a holographic correction device which replaces an artificial fringe pattern with a holographic compensating fringe pattern in response to a sufficient contrast of fringes being detected through a spatial filter.

28. The method of claim 22, further comprising:
- recording interference fringes in the reference leg optical signal; and
- controlling a holographic correction device in response to the recorded interference fringes.

29. The method of claim 22, further comprising generating one of a binary or a blazed fringe pattern to holographically compensate the reference leg optical signal.

30. The method of claim 22, further comprising maintaining a constant fringe contrast.

31. The method of claim 30, further comprising adjusting a waveplate to at least one of maintain a constant fringe contrast and substantially maximize an output of a spatial filter.

32. The method of claim 22, further comprising substantially maximizing an output of a spatial filter in an interferometer.

33. The method of claim 22, compensating for signal dropouts by coasting.

* * * * *